(12) United States Patent
Teh et al.

(10) Patent No.: US 11,157,440 B2
(45) Date of Patent: *Oct. 26, 2021

(54) SCALABLE 2.5D INTERFACE CIRCUITRY

(71) Applicant: Altera Corporation, San Jose, CA (US)

(72) Inventors: Chee Hak Teh, Bayan Lepas (MY); Arifur Rahman, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,068

(22) Filed: Mar. 27, 2020

(65) Prior Publication Data

US 2020/0226094 A1 Jul. 16, 2020

Related U.S. Application Data

(63) Continuation of application No. 16/674,138, filed on Nov. 5, 2019, which is a continuation of application
(Continued)

(51) Int. Cl.
| | |
|---|---|
| *G06F 13/00* | (2006.01) |
| *G06F 13/40* | (2006.01) |
| *G06F 15/78* | (2006.01) |
| *G06F 13/42* | (2006.01) |
| *G06F 1/06* | (2006.01) |
| *G06F 1/10* | (2006.01) |

(52) U.S. Cl.
CPC ............ *G06F 15/7803* (2013.01); *G06F 1/06* (2013.01); *G06F 1/10* (2013.01); *G06F 13/4022* (2013.01); *G06F 13/4234* (2013.01); *G06F 13/4291* (2013.01); *G06F 15/7864* (2013.01); *Y02D 10/00* (2018.01)

(58) Field of Classification Search
CPC . G06F 13/385; G06F 13/4022; G06F 15/7803
See application file for complete search history.

(56) References Cited

U.S. PATENT DOCUMENTS

| | | |
|---|---|---|
| 6,817,017 B2 | 11/2004 | Goodman |
| 7,188,276 B2 | 3/2007 | Yun |

(Continued)

*Primary Examiner* — David E Martinez
(74) *Attorney, Agent, or Firm* — Fletcher Yoder, P.C.

(57) ABSTRACT

A multichip package having a main die coupled to one or more daughter dies is provided. The main die may include embedded universal interface blocks (UIB) each of which can be used to interface with a corresponding daughter die to support high bandwidth parallel or serial communications. Each UIB may include an integrated processor subsystem and associated pattern sequencing logic to perform interface initialization and margining operations. Each UIB may perform simultaneous accesses to a daughter die across one or more channels. Each UIB may also include multiple phase-locked loop circuits for providing different clock signals to different portions of the UIB and a 2× clock phase generation logic. Each UIB may include multiple IO modules, each of which may optionally include its own duty cycle correction circuit. Each IO module may include buffer circuits, each of which may have a de-emphasis control logic for adjusting buffer drive strength.

20 Claims, 9 Drawing Sheets

Related U.S. Application Data

No. 15/954,078, filed on Apr. 16, 2018, now Pat. No. 10,482,060, which is a continuation of application No. 14/960,175, filed on Dec. 4, 2015, now Pat. No. 9,971,733.

(60) Provisional application No. 62/087,646, filed on Dec. 4, 2014.

(56) References Cited

U.S. PATENT DOCUMENTS

| | | |
|---|---|---|
| 7,318,112 B2 | 1/2008 | Park |
| 7,502,338 B1 | 3/2009 | Whitby-Strevens |
| 8,483,108 B2 | 7/2013 | Whitby-Strevens |
| 9,106,229 B1 | 8/2015 | Hutton et al. |
| 9,870,333 B1 * | 1/2018 | Lam .................. G06F 13/4027 |
| 2007/0174522 A1 | 7/2007 | Lee et al. |
| 2008/0244150 A1 | 10/2008 | Sharma |
| 2010/0091537 A1 | 4/2010 | Best et al. |
| 2010/0122001 A1 | 5/2010 | Miller et al. |
| 2012/0124257 A1 | 5/2012 | Wu |
| 2013/0138868 A1 | 5/2013 | Seroff et al. |
| 2014/0103985 A1 | 4/2014 | Andreev et al. |
| 2015/0357306 A1 | 12/2015 | Thottethodi et al. |
| 2017/0083475 A1 | 3/2017 | Wu et al. |

* cited by examiner

SCALABLE 2.5D INTERFACE CIRCUITRY

This application is a continuation of U.S. patent application Ser. No. 16/674,138, filed Nov. 5, 2019, which is a continuation of U.S. patent application Ser. No. 15/594,078, filed Apr. 16, 2018, which is a continuation of U.S. patent application Ser. No. 14/960,175, filed Dec. 4, 2015, which claims benefit of and priority to U.S. Provisional Patent Application No. 62/087,646, filed Dec. 4, 2014, which are hereby incorporated by reference herein in their entireties.

BACKGROUND

This relates generally to integrated circuit packages, and more particularly, to integrated circuit packages with more than one integrated circuit die.

An integrated circuit package typically includes an integrated circuit die and a substrate on which the die is mounted. The die can be coupled to the substrate through bonding wires or solder bumps. Signals from the integrated circuit die may then travel through the bonding wires or solder bumps to the substrate.

As demands on integrated circuit technology continue to outstrip even the gains afforded by ever decreasing device dimensions, more and more applications demand a packaged solution with more integration than possible in one silicon die. In an effort to meet this need, more than one die may be placed within a single integrated circuit package (i.e., a multichip package). As different types of devices cater to different types of applications, more dies may be required in some systems to meet the requirements of high performance applications. Accordingly, to obtain better performance and higher density, an integrated circuit package may include multiple dies arranged laterally along the same plane or may include multiple dies stacked on top of one another.

For example, an application-specific integrated circuit (ASIC) die and an accompanying memory die may be mounted on a common interposer substrate. An interface block may be included for facilitating communications between the ASIC die and the memory die. This interface block is, however, configured to only support the communications protocol associated with that particular memory die. While this may provide optimal performance for this particular configuration, the interface block is incapable of supporting communications with a wide variety of different memory dies and other types of daughter dies.

It is within this context that the embodiments described herein arise.

SUMMARY

In accordance with an embodiment, a multichip package is provided that includes a substrate, a daughter die (e.g., a memory element die) mounted on the substrate, and a main integrated circuit die mounted on the substrate. The main integrated circuit die may include a universal interface block (UIB) that interfaces with only the daughter die via signal paths formed in the substrate. The UIB may be capable of supporting a wide variety of different communications protocols, only a subset of which includes memory interface protocols.

The universal interface block may include a processor subsystem and pattern sequencing logic that perform memory initialization, memory interface margining, input-output calibration, and interconnect redundancy control during device startup. The universal interface block may include a plurality of input-output (IO) modules, where each IO module in the plurality of IO modules include transmit buffer circuitry. The transmit buffer circuitry has an adjustable drive strength that is controlled based on optimized drive strength settings derived using the processor subsystem during memory interface margining.

In configurations where the daughter die is a memory die, the universal interface block may be configured to replicate and store write data to logically equivalent addresses for multiple memory banks in a memory element daughter die. There may be multiple channels bridging the UIB to the memory die. The universal interface block may be configured to simultaneously access a selected memory bank in the memory element die across each of the plurality of channels. If desired, a configurable crossbar switch that is interposed between the memory element die and the universal interface block may be used to bind one of the channels to at least one memory bank in the memory element die or to bind one of the channels to multiple memory banks in the memory element die.

In accordance with another embodiment not mutually exclusive with the aforementioned embodiment, the universal interface block may include multiple input-output (IO) modules organized into four contiguous quadrant portions. In one suitable arrangement, two separate phase-locked loop (PLL) circuits may be used to supply clock signals of different frequencies to each quadrant of the UIB. In another suitable arrangement, four separate PLL circuits may be used to supply clock signals of different frequencies to each quadrant of the UIB.

In accordance with yet another suitable embodiment not mutually exclusive with the aforementioned embodiments, each of the multiple IO modules in the universal interface block may include transmit circuitry having an output driver with an adjustable drive strength and de-emphasis control logic that adjusts the drive strength of the output driver based on the behavior of data signals being transmitted by the transmit circuitry. The de-emphasis control logic may output an asserted de-emphasis control signal to the output driver in response to determining that the data signals are at a constant logic level and may output a deasserted de-emphasis control signal to the output driver in response to determining that the data signals are constantly switching between different logic levels.

One of the multiple phase-locked loops in the UIB may generate a first clock signal at a first frequency and a second clock signal at a second frequency that is double the first frequency. The IO module may also include clock phase generation logic that receives the first and second clock signals and that generates a corresponding clock phase signal associated with the second clock signal, where the second clock signal and the clock phase signal are fed to the de-emphasis control logic. The UIB may further include at least one clock signal pipelining stage interposed between the clock phase generation logic and the transmit circuitry. If desired, the transmit circuitry may include a duty cycle correction circuit connected at its clock input port.

Further features of the invention, its nature and various advantages will be more apparent from the accompanying drawings and following detailed description.

DETAILED DESCRIPTION

Embodiments of the present invention relate to integrated circuits, and more particularly, to integrated circuit packages that include multiple integrated circuit dies (sometimes referred to as multichip packages).

Figure 1:
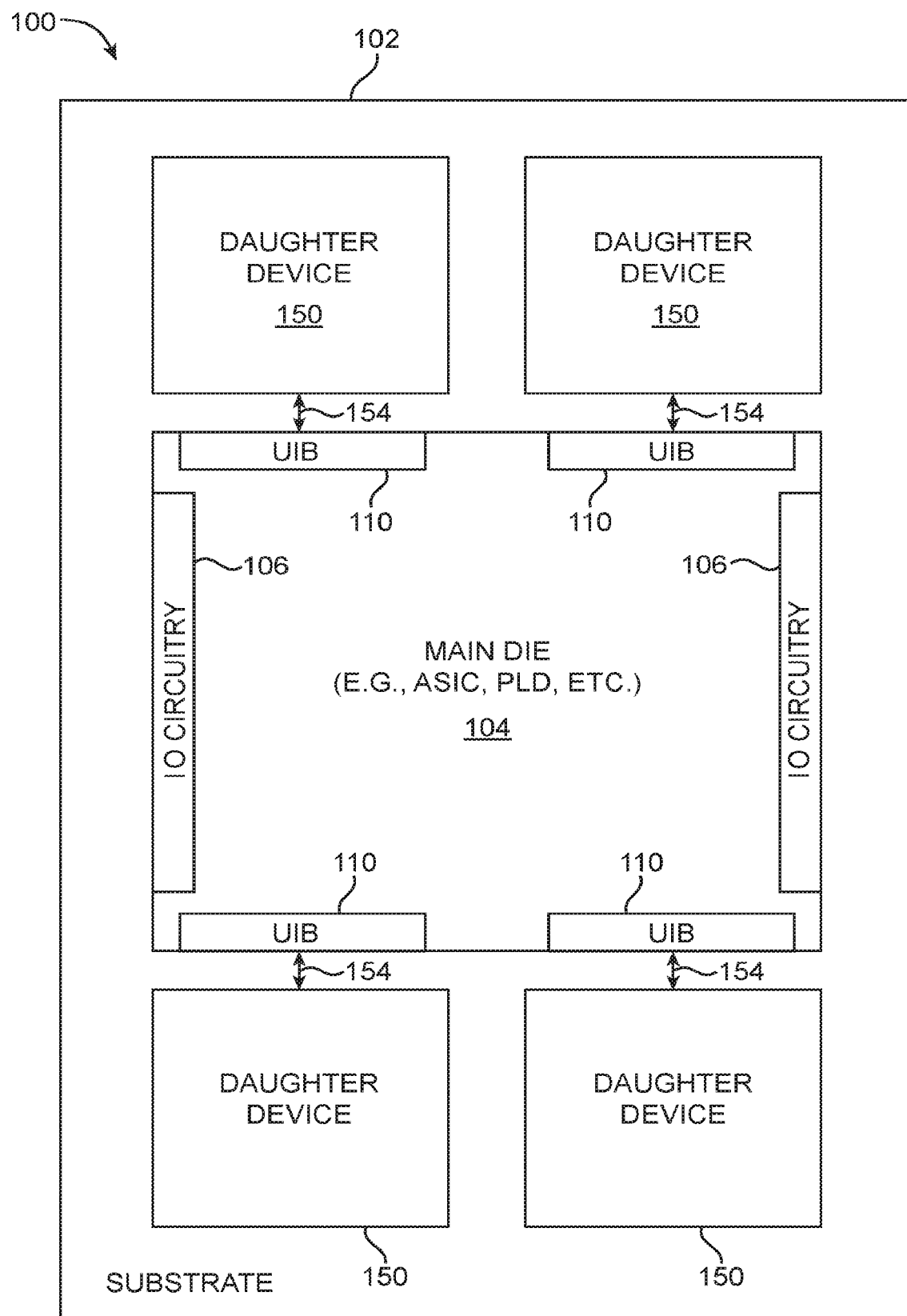
FIG. 1 is a diagram of an illustrative multichip package that includes a main integrated circuit die coupled to multiple daughter dies via respective embedded universal interface blocks in accordance with an embodiment.

FIG. 1 is a diagram of an illustrative multichip package 100. As shown in FIG. 1, multichip package 100 may include one or more integrated circuit dies including but not limited to an integrated circuit (IC) die 104 and associated auxiliary integrated circuit dies 150. Integrated circuit 104 that is used to communicate with one or more auxiliary dies or "daughter" dies is sometimes referred to as the main die of the multichip package. Integrated circuit system 100 may be a stacked dies system, a System-in-Package (SiP), a Package-on-Package (PoP), etc.

Main IC die 104 may be any suitable integrated circuit such as a programmable logic device (PLD), an application-specific standard product (ASSP), and an application-specific integrated circuit (ASIC). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. Integrated circuit 104 may also include input-output (IO) circuitry 106 such as transceiver circuitry for interfacing with components external to package 100.

Dies 104 and 150 may be mounted on an intermediary substrate such as a passive silicon substrate 102 or other interposer substrate carrier. In other suitable arrangements, devices 104 and 150 may be mounted on a laminate substrate and may communicate with one another via local bridging interconnects embedded in the laminate substrate. This arrangement in which multiple dies are mounted on a common package substrate may sometimes be referred to as a "2.5D" stacked die arrangement.

Each daughter die 150 may communicate with a corresponding physical (PHY) layer interface module such as universal interface block (UIB) 110 via inter-die channels 154. Inter-die channels 154 may be formed from conductive traces in substrate 102 or other suitable signal pathways between UIB 110 and corresponding microbumps (not shown) on daughter dies 150. Channels 154 may sometimes be collectively referred to as a universal interface bus.

In accordance with an embodiment, one or more daughter dies 150 may be memory devices (sometimes referred to herein as memory elements). Memory elements 150 may be implemented using random-access memory such as static random-access memory (SRAM), dynamic random-access memory (DRAM), low latency DRAM (LLDRAM), reduced latency DRAM (RLDRAM), or other types of volatile memory. If desired memory element 150 may also be implemented using nonvolatile memory (e.g., fuse-based memory, antifuse-based memory, electrically-programmable read-only memory, etc.). Configured in this way, each block 110 may serve as a physical-layer bridging interface between an associated memory controller (e.g., a non-reconfigurable "hard" memory controller or a reconfigurable "soft" memory controller logic) on the main die 104 and one or more high-bandwidth channels that is coupled to an associated memory element 150. In other suitable embodiments, daughter dies 150 may be transceiver chips, networking adapters, discrete passive components, separate debugging circuits, or other types of processing circuits. The universal interface block may be capable of supporting a wide variety of communications protocols, which are not limited to memory interface protocols, for interfacing with these different types of daughter dies.

Each instantiation of UIB 110 can be used to support multiple parallel channel interfaces such as the JEDEC JESD235 High Bandwidth Memory (HBM) DRAM interface or the Quad Data Rate (QDR) wide IO SRAM interface (as examples). Each of the parallel channels can support single data rate (SDR) or double data rate (DDR) communications. If desired, UIB 110 may also be used to support a plurality of serial IO channel interfaces. In one suitable embodiment, each UIB 110 that is capable of supporting a wide array of channel interfaces may be implemented as a hard intellectual property (IP) block that is embedded within die 104. In yet other suitable embodiments, UIB 110 may be embedded in substrate 102 or other parts of multichip package 100. Configured in this way, UIB 110 enables low-latency, high capacity, high random transaction rate (RTR) throughput that is at least equal to external SRAM performance and/or high capacity storage compatible with external RLDRAMs or DDRx DRAMs with reduced power and zero IO footprint.

Figure 2:
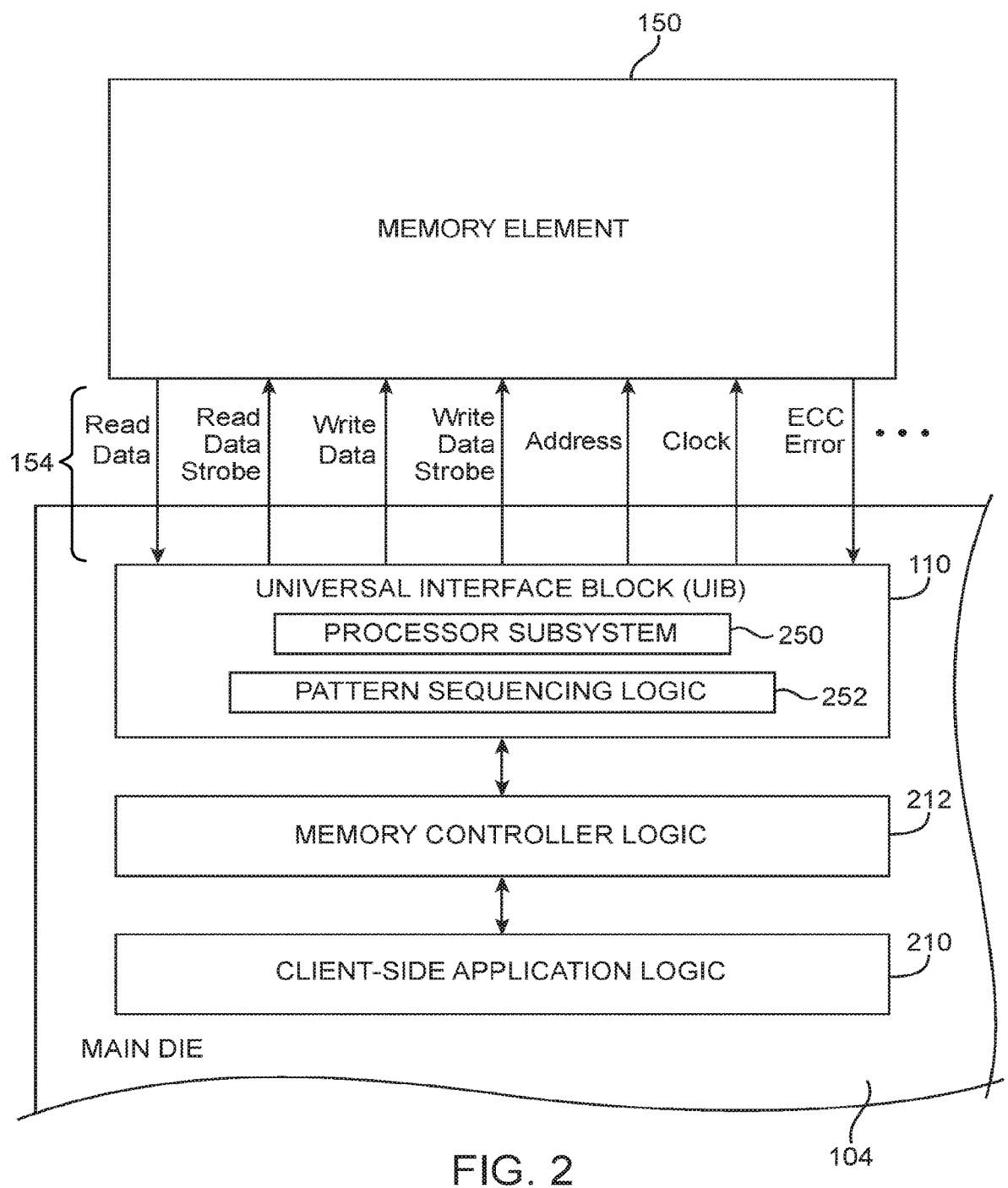
FIG. 2 is a diagram showing an illustrative universal interface block (UIB) that can be used to support communications between the main die and an accompanying memory element in accordance with an embodiment.

FIG. 2 is a diagram of an exemplary configuration in which UIB 110 is used to support a high bandwidth memory (HBM) interface between memory element 150 (e.g., an LLDRAM) and memory controller logic 212 on main die 104. Memory controller 212 may be capable of handling user signals for a single channel but can support communications with one or more ports in the memory element 150.

Memory controller logic 212 may communicate with a client-side application logic 210 to exchange data signals (e.g., read and write data signals), clock signals (e.g., system clock signals, read data strobe, write data strobe, etc.), address signals, error correction code (ECC) information, and other suitable control signals. Memory controller 212 may relay at least some of this information to UIB circuit 110. The UIB interface 110 may communicate with memory element 150 via 2.5D interconnect routing structures 154 formed on substrate 102 (see FIG. 1).

As shown in FIG. 2, universal interface block 110 may be provided with an embedded processor such as processor subsystem (PSS) 250 and an associated pattern sequencing logic 252 that are used to perform memory initialization (e.g., operations that initialize daughter memory elements 150 while main die 104 is being configured for normal operation), memory interface margining (e.g., test pattern training using the pattern sequencing logic), IO calibration (e.g., to determine optimal IO driver strength while minimizing power consumption), testability and manufacturability testing (e.g., interconnect redundancy checking to allow use of spare interconnects when necessary), and other suitable operations. Operated in this way, UIB 110 can help expedite user start-up operations, allow re-use of the memory subsystem during partial-reconfiguration of the main die (assuming the main die is a partially-reconfigurable logic device), simplify user-selectable memory initialization operations, and enable redundant IO remapping during device startup to provide enhanced fault resilience.

In particular, the use of timing margining algorithms running on integrated processor subsystem 250 can help optimize the drive strengths of IO buffers within UIB 110 based on the electrical property and interface frequency of the channel. Sweeping timing margining algorithms and training patterns across various IO drive strengths (via programmability of a number of pull-up or pull-down driver legs currently being enabled) at the desired operating frequency will yield data indicating the minimum drive strength that is capable of driving the channel across different 2.5D interface technologies (e.g., the least number of driver legs that needs to be enabled to support driving signals across a silicon interposer, an organic interposer, an embedded interconnect bridge, etc.). In general, the PSS 250 may be configured to program the optimized drive strength into the IO buffers after margining the interface to yield a power-performance optimized interface.

Figure 3:
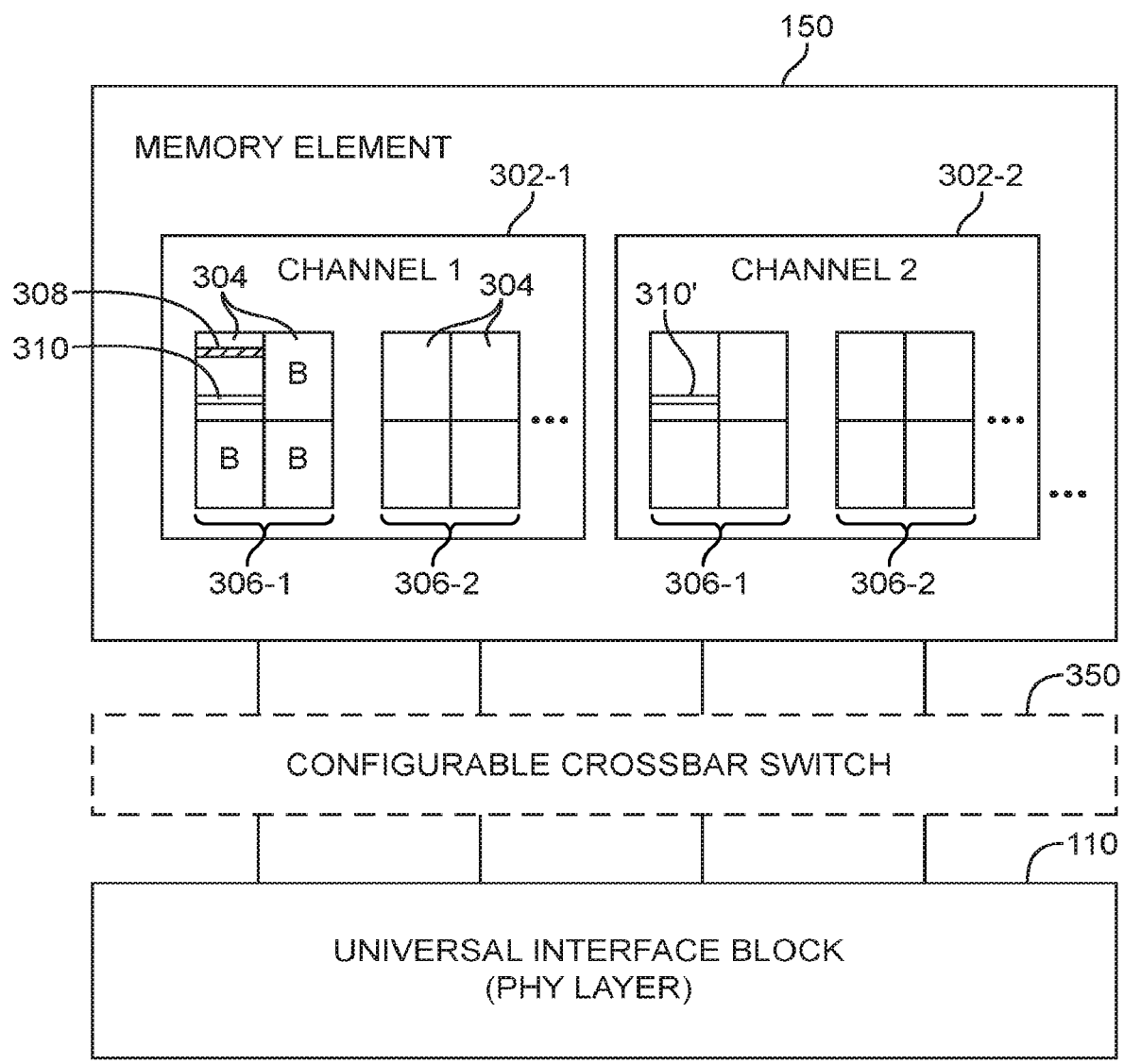
FIG. 3 is a diagram showing an optional crossbar switch that can be used to address one or more adjacent memory banks associated with one or more channels in accordance with an embodiment.

In another suitable embodiment, a configurable crossbar switch 350 may be interposed between physical layer UIB circuit 110 and memory element 150 (see, e.g., FIG. 3). If desired, crossbar switch 350 may also be implemented before UIB circuit 110 or within memory element 150 itself. As shown in FIG. 3, memory element 150 may include multiple accessible channels, each of which includes multiple groups of memory banks 304. In the example of FIG. 3, each of channels 1 and 2 includes at least a first group of memory banks 306-1 and a second group of memory banks 306-2.

In particular, UIB 110 may include logic that is configured to automatically replicate and store write data (i.e., data supplied by an associated memory controller 212) to logically equivalent addresses within one or more adjacent banks of memory associated with one or more channels using crossbar switch 350 to help reduce the per-channel command activation period. Crossbar switch 350 may be used to facilitate desired bank access from any port and to enable multiple ports to share read/write access to a common pool of banks. Crossbar switch 350 can be used to help access two adjacent memory banks in group 306-1 in channel 1 or to simultaneously access a given bank in group 306-2 from both channels 1 and 2.

In yet other suitable embodiments, memory element banks may be replicated to help reduce per-channel command activation period, whereas memory element channels may be replicated to enable reduced per-device command activation period. For example, consider a scenario in which row 308 in a first bank 304 in group 306-1 in channel 1 is currently being accessed. If a subsequent access is addressed to another row 310 in that same bank, row 310' in the first bank 304 in group 306-1 in channel 2 would be accessed instead of channel 1 since this would not require deactivating the current row 308 and then activating the new row 310 in channel 1, thereby relaxing performance requirements. This assumes that data is replicated across all channels by broadcasting multichannel writes.

In general, the use of crossbar switches can help enable substantially higher content availability and a higher volume port count, reduce power consumption, minimize external IO footprint, and remove the IO interconnect from being the bandwidth bottleneck of memory access operations. If desired, crossbar switch 304 may be bypassed for direct channel/bank binding. In yet other arrangements, universal interface block 110 may be capable of performing all the functions of crossbar switch 350, so a separate crossbar circuit need not be used.

The example described above in which UIB 110 is used to interface with memory elements is merely illustrative and does not serve to limit the scope of the present invention. In general, UIB 110 may be used to interface with any suitable electronic component coupled to system 100.

Figure 4:
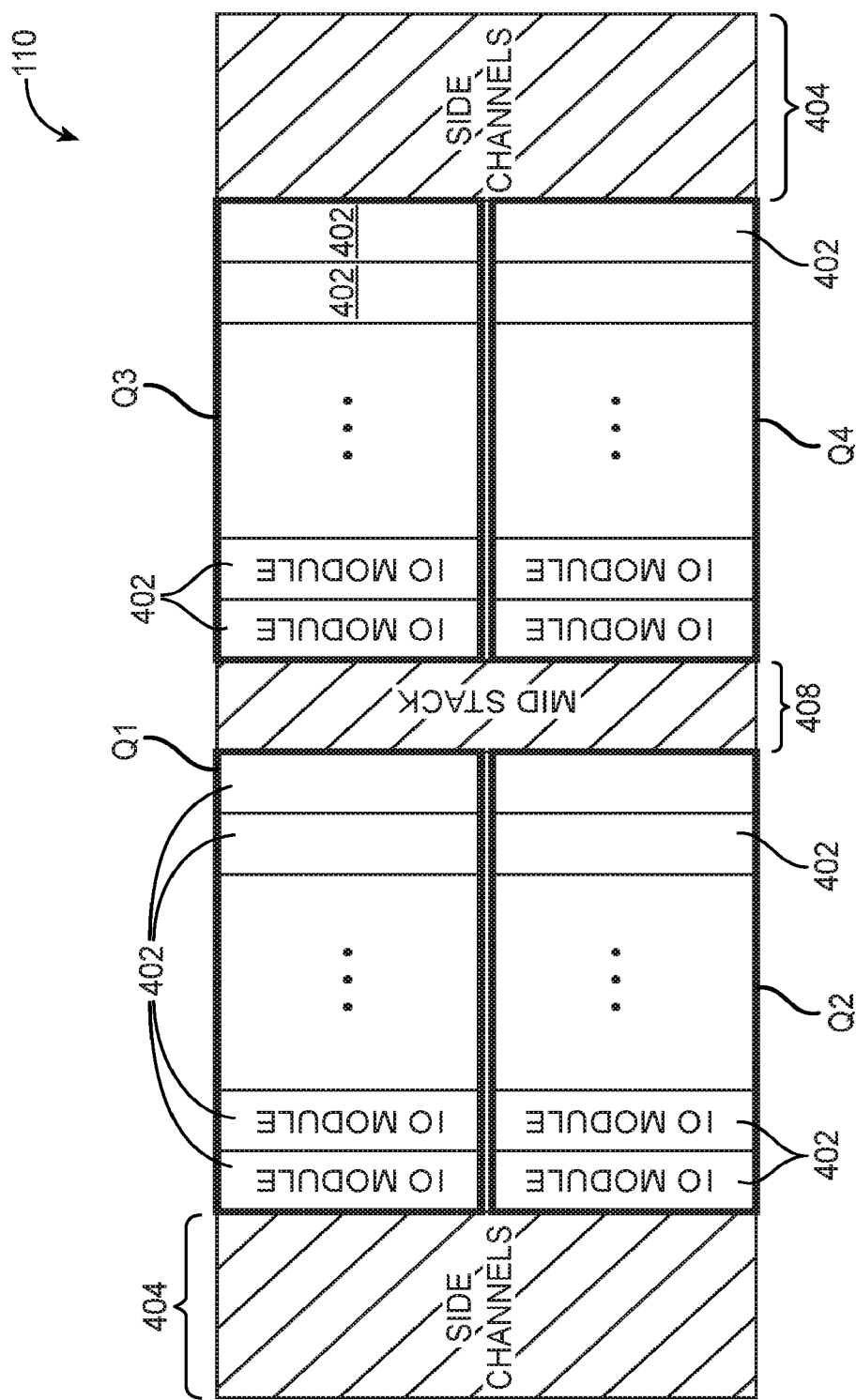
FIG. 4 is a diagram of an illustrative universal interface block (UIB) organized into quadrant portions in accordance with an embodiment.

In general, universal interface block 110 may be partitioned into multiple IO sub-modules. As shown in FIG. 4, physical-layer UIB 110 may include a modular organization of IO modules 402. Each IO module 402 may (as an example) include 48 input-output drivers and may sometimes be referred to as a 48-IO unit or a UB-48 module. This modular design may allow for expansion to support wider or narrower 2.5D interfaces. As an example, each IO module 402 may include forty single-ended IO buffers and eight differential IO buffers to help scale across various 2.5D architectures and memory protocols. The use of 48 IO buffers in a single UIB 110 is merely illustrative. In general, universal interface block 110 may include less than 48 IO buffers or more than 48 IO buffers. Each channel may be supported using one or more IO modules 402. In some arrangements, a channel may be supported using multiple interleaved IO modules 402.

UIB 110 may further be divided into four groups or quadrants of active IO modules. As shown in FIG. 4, UIB 110 may be partitioned into a first quadrant Q1 (e.g., a first contiguous region of the UIB) including a given number of IO modules 402, a second quadrant Q2 (e.g., a second contiguous region of the UIB) of the given number of IO modules 402, a third quadrant Q3 (e.g., a third contiguous region of the UIB) of the given number of IO modules 402, and a fourth quadrant Q4 (e.g., a fourth contiguous region of the UIB) of the given number of IO modules 401. Each quadrant may have the same or different number of IO modules 402.

Quadrants Q1 and Q2 may be separated from quadrants Q3 and Q4 by an interposing portion 408 known as the "Mid Stack" (MS). There may also be side channels 404 in which unused modules 402 can be formed or in which clocking circuits or other control circuits can be formed. Interface block 110 may also include an interface distribution strip and associated PHY logic circuitry containing synthesizable control logic required for IO calibration and staging (not shown).

Conventionally, an interface block included only one phase-locked loop circuit positioned in mid stack portion 408. Configured as such, only clock signals of the same frequency (or an integer multiple of a base frequency) are provided to all of the different quadrants.

In accordance with an embodiment, UIB 110 may be provided with two or more integer or fractional phase-locked loops (PLL) running at the same or different frequencies to independently serve as clock sources for each quadrant or quadrant pair. These PLL circuits may be formed in the mid stack portion 408 or in the side channel portions 404.

Figure 5A:
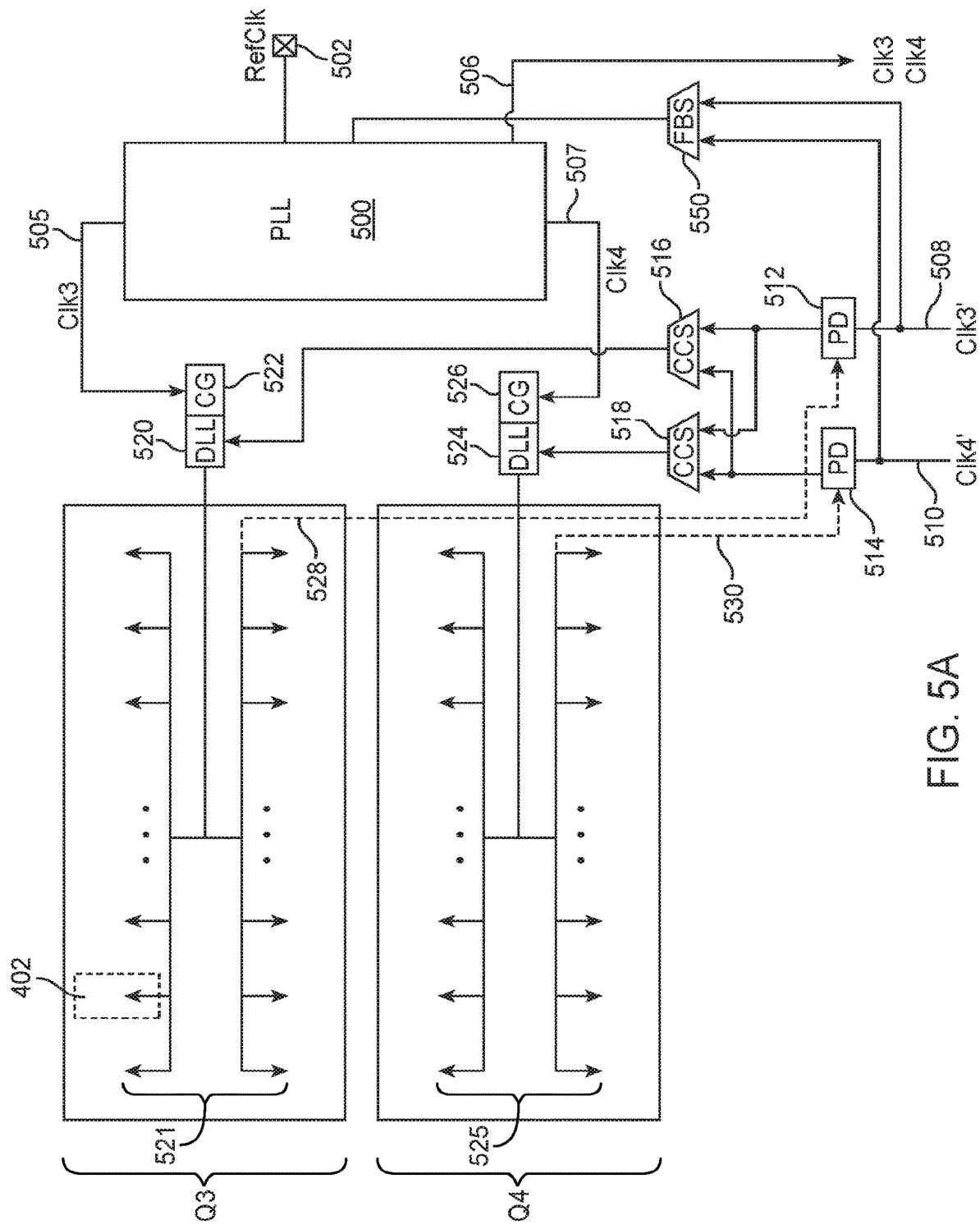
FIG. 5A is a diagram illustrating how a UIB can include two phase-locked loops (PLLs) each of which is used to clock a UIB quadrant pair in accordance with an embodiment.

FIG. 5A is a diagram illustrating how UIB 110 can include two PLLs each of which is used to clock a UIB quadrant pair in accordance with an embodiment. Only one PLL 500 that controls quadrants Q3 and Q4 is shown in FIG. 5A so as to not unnecessarily obscure the present embodiment. PLL 500 controlling quadrants Q3 and Q4 may be formed on one side of UIB 110 (e.g., in a rightmost side channel portion), whereas another PLL for controlling quadrants Q1 and Q2 may be formed on the other side of UIB 110 (e.g., in a leftmost side channel portion). In such arrangements, each pair of UIB quadrants may be interposed between at least two surrounding PLL circuits.

PLL 500 may receive a reference clock signal RefClk. PLL 500 may output corresponding clock signals Clk3 and Clk4 to a core region of the main die via path 506. Signals Clk3 and Clk4 are therefore sometimes referred to as core clock signals. Core clock signal Clk3 may also be fed over path 505 to a first clock gating (CG) circuit 522 that is coupled to quadrant Q3 via a first delay-locked loop (DLL) circuit 520, whereas core clock signal Clk4 may be fed over path 507 to a second clock gating (CG) circuit 526 that is coupled to quadrant Q4 via a second DLL circuit 524.

DLL circuit 520 may output a first IO clock signal that is distributed to each IO module 402 in quadrant Q3 via clock tree 521. Similarly, DLL circuit 524 may output a second IO clock signal that is distributed to each IO module 402 in quadrant Q4 via clock tree 525.

The core clock signals may be propagated through clock trees (e.g., clock distribution networks) in the core region of the main die and may be fed back to the UIB as core fabric clock signal Clk3' over path 508 and core fabric clock signal Clk4' over path 510. In general, it may be desirable to align the core fabric clock signals to the IO clock signals. To accomplish this, phase detector circuits such as phase detectors (PD) 512 and 514 may be used.

In particular, phase detector 512 may be configured to compare the phase between core fabric clock signal Clk3' and the first IO clock signal that is received via dotted path 528 and to generate a first delay control signal based on the amount of detected phase difference. Similarly, phase detector 514 may be configured to compare the phase between core fabric clock signal Clk4' and the second IO clock signal that is received via dotted path 530 and to generate a second delay control signal based on the amount of detected phase difference.

Core clock selection (CCS) multiplexers may be used to selectively pass through one of the delay control signals to each of the delay-locked loops. In the example of FIG. 5A, a first CCS multiplexer 516 may have a first input that receives the first delay control signal from PD 512, a second input that receives the second delay control signal from PD 514, and an output that is coupled to DLL 520. Multiplexer 516 may be configured to route a selected one of its input signals to its output. Similarly, a second CCS multiplexer 518 may have a first input that receives the second delay control signal from PD 514, a second input that receives the first delay control signal from PD 512, and an output that is coupled to DLL 524. Multiplexer 518 may be configured to route a selected one of its input signals to its output. If desired, a feedback clock select (FBS) multiplexer such as multiplexer 550 may be configured to route a selected one of the core fabric clock signals (e.g., signals Clk3' or Clk4') back to PLL 500 to serve as a reference clock.

Arranged in this way, each phase detector and delay-locked loop paid associated with the generation of an IO clock signal serves collectively as a clock phase alignment (CPA) circuit that is capable of phase aligning the IO clock signal to a selected core fabric clock signal to facilitate core-to-interface (C2P) and interface-to-core (P2C) transfers. Operated in this way, the entire UIB can be made fully phase-aligned to the different core clock sources. If desired, the CPA circuit can also be configured to reverse the direction of alignment (i.e., to align the core fabric clock to the IO clock by using the CPA to delay the clock to the core fabric to phase-match with the IO clock signal).

Figure 5B:
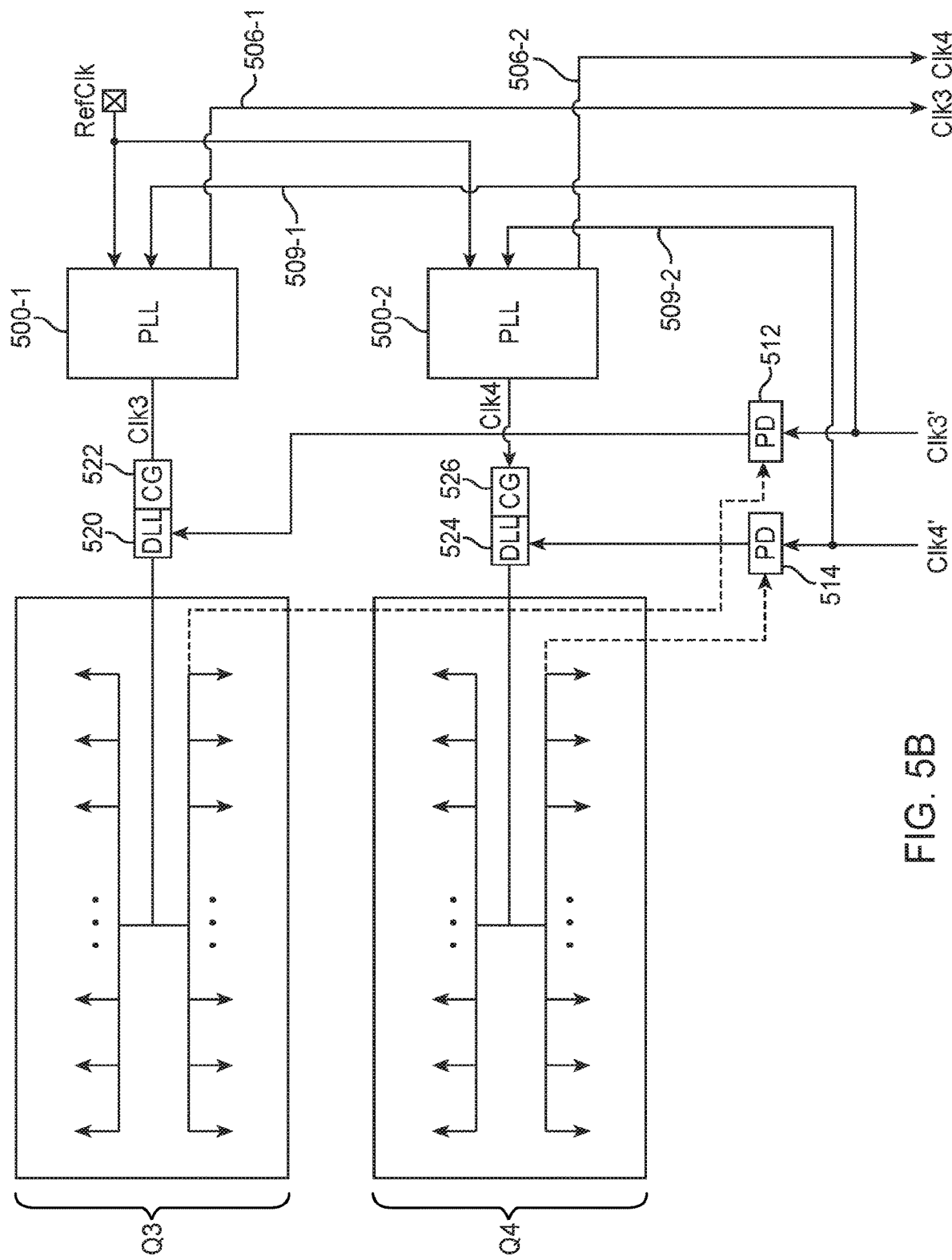
FIG. 5B is a diagram illustrating how a UIB can include four phase-locked loops (PLLs) each of which is used to clock a respective UIB quadrant in accordance with an embodiment.

FIG. 5B shows a portion of another suitable arrangement in which UIB 110 includes four phase-locked loops (PLLs) each of which is used to clock a respective UIB quadrant. As shown in FIG. 5B, PLL 500-1 may generate IO clock signals for UIB quadrant Q3, whereas PLL 500-2 may generate IO clock signals for UIB quadrant Q4. The two other PLL circuits for controlling quadrants Q1 and Q2 are not shown in order not to unnecessarily obscure the present embodiments.

PLLs 500-1 and 500-2 may receive reference clock signal RefClk. PLL 500-1 may output corresponding core clock signal Clk3 to the core logic region of the main die via path 506-1 and also to quadrant Q3 via DLL 520. PLL 500-2 may output corresponding core clock signal Clk4 to the core logic region of the main die via path 506-2 and also to quadrant Q4 via DLL 524.

Similar to the embodiment in FIG. 5A, the IO clock signals distributed to each quadrant may be fed back to phase detectors such as PDs 512 and 514. Since each DLL circuit is associated with a dedicated PLL in this scenario, clock selection multiplexers need not be used in the configuration of FIG. 5B. Phase detector 512 may generate dedicated delay control signals for DLL 520, whereas phase detector 514 may generate dedicated delay control signals for DLL 524. If desired, the core fabric clock signals may also be fed back to each of the PLLs to serve as reference clock signals (see, e.g., feedback paths 509-1 and 509-2).

The use of multiple PLLs in FIGS. 5A and 5B enables each quadrant of UIB 110 to operate at different frequencies and phases. This allows the main die to interface with clients operating at varying frequencies for each channel using UIB 110. In certain embodiments, PLL(s) 500 may be operated as a fractional PLL to increase the availability of frequency step sizes and reduce coupling noise. If desired, more than four PLLs may be included in each UIB 110 to provide enhanced frequency tuning granularity.

Figure 6:
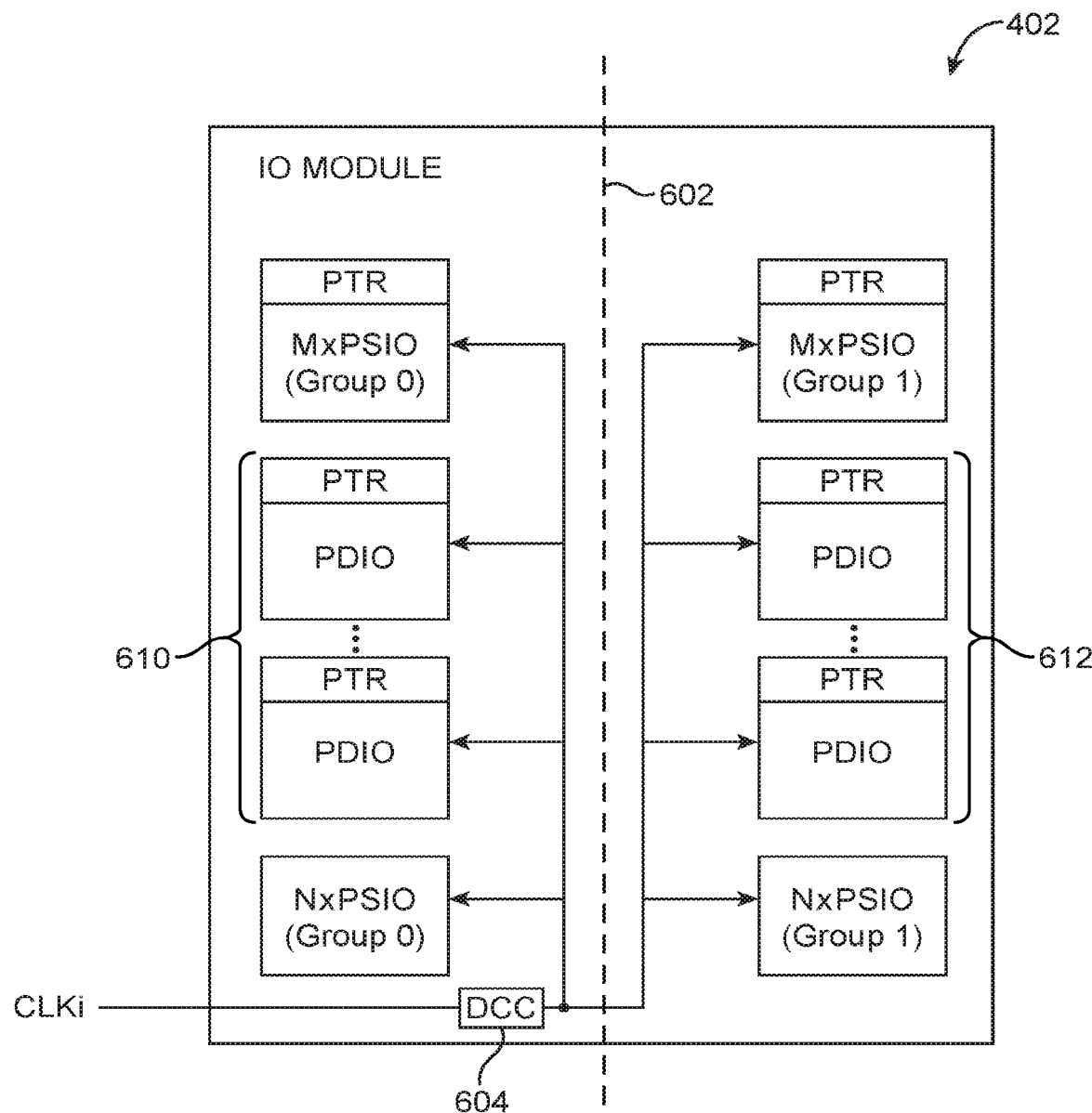
FIG. 6 is a diagram illustrating use of a duty cycle correction circuit that is inserted at the clock input port of a single input-output module for improving channel timing characteristics in accordance with an embodiment.

In an effort to improve channel timing performance for high-speed applications (e.g., 1 GHz and beyond), duty-cycle correction circuitry may be incorporated into each IO module 402 within UIB 110. FIG. 6 is a diagram illustrating use of a duty cycle correction circuit that is inserted at the clock input port of IO module 402 for improving channel timing characteristics.

As shown in FIG. 6, module 402 may include programmable single-ended IO (PSIO) buffers and programmable differential/single-ended IO (PDIO) buffers. In some embodiments, module 402 may be organized into two separate virtual partitions (see, partitions as separated by dotted line 602). For example, a first virtual partition may include a first group (Group 0) of (M+N) PSIOs, and a first group 610 of PDIOs. The M PSIOs and the first group 610 of PDIOs may each have an associated pointer generation (PTR) block. Similarly, a second virtual partition may include a second group (Group 1) of (M+N) PSIOs, and a second group 612 of PDIOs. The M PSIOs in the second virtual partition and the second group 612 of PDIOs may also each have an associated pointer generation (PTR) block.

In accordance with an embodiment, a duty cycle correction (DCC) circuit 604 may be inserted at the clock input path of module 402 to correct the duty cycle of the IO clock signal Clki. The IO clock signal Clki may represent a clock signal fed through an associated clock tree from a respective a DLL circuit in FIG. 5A or 5B. The use of DCC circuit 604 architecturally guarantees a 50% duty cycle locally at each module 402, which helps to ease operation at higher frequencies (e.g., at 1 GHz and above).

Figure 7:
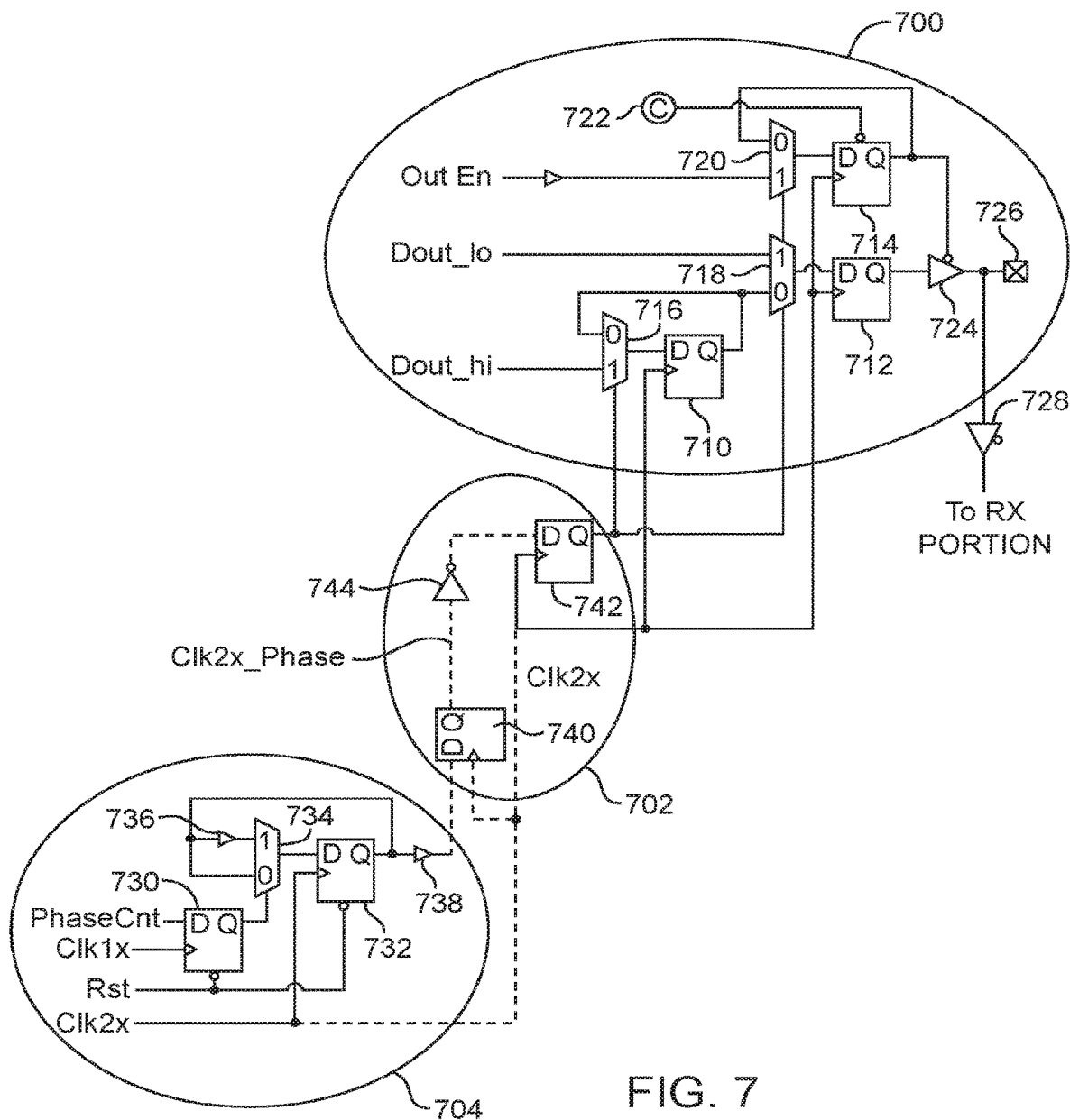
FIG. 7 is a diagram illustrating clocking of a pipeline stage prior to an input-output (IO) buffer at double memory clock frequency for improving the clock duty cycle of the channel in accordance with an embodiment.

In accordance with another suitable embodiment, each individual IO buffer within module 402 may be clocked at double the memory clock frequency to help improve channel timing. FIG. 7 is a diagram showing a transmit portion 700 of a PSIO buffer. As shown in FIG. 7, a central double (2×) clock phase generation logic 704 may feed a clock signal at double the nominal IO clock frequency via one or more pipeline stages 702 to control PSIO transmit circuitry 700. The use of double clocking circuitry, which is an alternative to the duty-cycle correction technique described in connection with FIG. 6, can help provide regulated channel timings for both rise and fall phases of the interface clocking, which can help improve performance for interfaces running at 1 GHz (2 Gbps) and above.

The 2× clock phase generation logic 704 may preferably be formed near one of the multiple PLL circuits in the UIB and may be configured to receive a first clock signal Clklx (i.e., a clock signal running at the nominal memory clock rate), a second clock signal Clk2x (i.e., a clock signal running at double the nominal memory clock rate), a phase count signal PhaseCnt, and a reset signal Rst. As shown in FIG. 7, logic 704 may include latches 730 and 732 (e.g., digital flip-flop circuits), multiplexer 734 and inverters 736 and 738 connected in the way shown in FIG. 7. Arranged as such, logic 704 may pass through the 2× clock signal Clk2x and may generate an accompanying 2× clock phase signal Clk2x_Phase at the output of inverter 738. Signal Clk2x_Phase may be deasserted (i.e., driven to logic "0") to indicate a low clock phase of signal Clklx and may be asserted (i.e., driven to logic "1") to indicate a high clock phase of signal Clklx. This additional phase information may be necessary for proper operation of transmit circuit 700.

Pipeline stage 702 may include at least a latch and inverter pair. In the example of FIG. 7, pipeline stage 702 includes latches 740 and 742 and inverter 744. Latch 740 may have a data input that receives signal Clk2x_Phase, a clock input that receives signal Clk2x, and data output. Latch 742 may have a data input that receives an inverted version of signal Clk2x_Phase via inverter 744, a clock input that receives signal Clk2x_Phase, and a data output that is coupled to circuit 700.

In general, each IO module 402 in a UIB quadrant may receive a 2× IO clock signal via a different number of pipeline stages. As an example, a first IO module 402 at the center of a given UIB quadrant may receive its IO clock signal via five pipeline stages 702, whereas a second IO module 402 at the edge of the given UIB quadrant may receive its IO clock signal via nine pipeline stages 702. A third IO module 402 at an intermediate location between the first and second IO modules in the given UIB quadrant may, for example, receive its IO clock signal via seven pipeline stages (as an example). This example is merely illustrative and does not serve to limit the scope of the present invention.

Still referring to FIG. 7, IO buffer transmit circuitry 700 may be restructured to handle the 2× clock signal Clk2x and the 2× clock phase signal Clk2x_Phase. PSIO transmit circuitry 700 may include latches 710, 712, and 714, multiplexers 716, 718, and 720, and an output driver 724 that drives output signals to an input-output (IO) pin 726. IO pin 726 may also be coupled to a receive portion (not shown) via receive buffer driver 728.

Transmit circuitry 700 may receive signals Clk2x and Clk2x_Phase from clock phase generation logic 704 via one or more pipeline stages 702, data signals Dout_hi and Dout_lo, and an output enable signal OutEn. Data signal Dout_lo may include signals associated with the low phase of signal Clklx, whereas signal Dout_hi may include signals associated with the high phase of signal Clklx. Signal OutEn may be asserted to enable output driver 724 or may be deasserted to deactivate driver 724 entirely. Similarly, a control bit that is stored in configuration memory cell 722 may be set high to enable the output driver 724 or may be set low to disable driver 724.

In the example of FIG. 7, signal Clk2x_Phase is used to control the routing configuration of multiplexers 716, 718, and 720, whereas signal Clk2x is fed to the clock input of latches 710, 712, and 714. Connected in this way, the IO buffers can be scaled to support a greater range of interface frequencies and data rates, which helps to relax rate matching requirements on the 2.D interconnects and reduce the design and cost of the multichip package.

Figure 8:
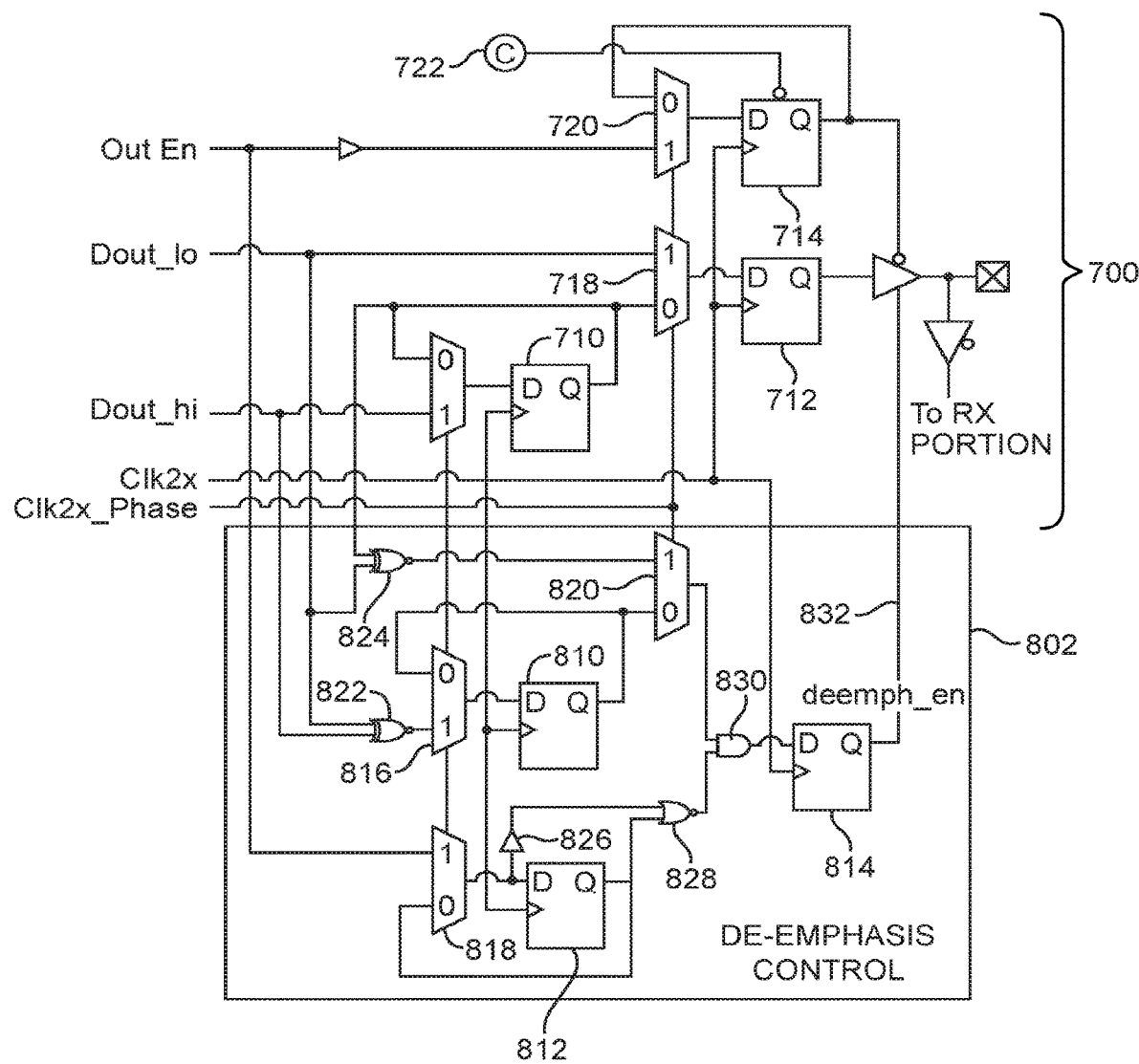
FIG. 8 is a diagram of illustrative de-emphasis control logic that can be used to turn off unnecessary driver legs in an IO buffer when driving signals with reduced transitions in accordance with an embodiment.

In conjunction with the embodiment of FIG. 7, a de-emphasis control logic may also be included to help reduce power consumption. FIG. 8 shows how transmit circuitry 700 of the type described in connection with FIG. 7 can be coupled to de-emphasis control logic 802.

De-emphasis control logic 802 includes circuitry configured to gradually turn off driver legs when driving constant values across multiple consecutive clock cycles. For example, logic 802 may provide an asserted control signal deemph_en via path 832 to the output driver of circuitry 700 to turn off more pull-up current paths (or to turn on fewer pull-up current paths) if the output driver is driving consecutive logic high values. On the other hand, if the output driver is driving consecutive logic low values, logic 802 may provide deassert deemph_en to the output driver of portion 700 to turn off more pull-down current paths (or to turn on fewer pull-down current paths). This also allows for faster switching as the IO driver is not driving a strong logic "0" or "1," thereby improving performance.

The use of de-emphasis logic 802 can help reduce power consumption and is particularly useful when used with Data Bus Inversion (DBI) interface schemes where signal transitions are minimized via use of an extra DBI control bit. When driver legs are deactivated, this also allows for faster switching as the IO is not driving a strong logic zero or one.

As shown in FIG. 8, de-emphasis control logic 802 may include latches 810, 812, and 814, multiplexers 816, 818, and 820, logic exclusive-or (XOR) gates 816 and 824, inverter 826, logic NOR gate 828, and logic AND gate 830. Similar to the implementation of transmit circuitry 700, multiplexers 816, 818, and 820 in the de-emphasis logic may be controlled by signal Clk2x_Phase while latches 810, 812, and 814 have clock control inputs that receive signal Clk2x. Connected in the way shown in FIG. 8, the circuits of control logic 802 analyze the incoming data signals Dout_lo and Dout_hi based on signal Clk2x_Phase to determine when constant values are being transmitted by the PSIO buffer.

If desired, the processor subsystem 250 described in connection with FIG. 2 may perform timing margining algorithms to determine the optimal IO drive strengths based on the electrical property of the interface and the operating frequency of a particular channel. For example, PSS 250—with the help of pattern sequencing logic 252—may perform timing margining operations using training patterns across various IO drive strengths (e.g., by programming the number of pull-up and pull-down current paths) to determine the least drive strength that is still capable of driving the channel across different 2.D interface technologies. Once calibrated, the PSS 250 may program this optimized drive strength into the IO buffers such that the IO buffers will use this calibrated setting whenever control signal deemph_en is asserted. This margining operation may optionally be performed during normal operation to dynamically balance the power versus performance of the IO buffer if frequency switching is allowed on the interface channel.

The examples of FIGS. 7 and 8 in which the 2× clock phase generation logic and the de-emphasis control logic are used on connection with a PSIO buffer is merely illustrative. If desired, the 2× clocking and the associated phase generation and the de-emphasis control may be applied to a PDIO buffer (FIG. 6) or any other suitable type of IO buffer that can be included within universal interface block 110.

Unless otherwise indicated, the embodiments of FIGS. 2-8 are not mutually exclusive. In other words, a die within a multichip package that interfaces with multiple daughter dies may have one or more embedded universal interface blocks (FIG. 1), each of which includes its own processor subsystem 250 and pattern sequencing logic 252 (FIG. 2), is capable of performing simultaneous access across different channels (FIG. 3), includes two or more phase-locked loop circuits for generating clock signals of varying frequencies/phases to respective portions of the UIB (FIG. 5A or 5B), includes a separate duty-cycle correction circuit 604 in each IO module 402 in the UIB (FIG. 6), includes 2× clock phase generation logic 704 and one or more associated clock pipelining stages 702 for each IO module 402 in the UIB (FIG. 7), and includes de-emphasis logic for selective reducing the drive strength of the IO buffers in each IO module 402 in the UIB (FIG. 8).

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The foregoing is merely illustrative of the principles of this invention and various modifications can be made by those skilled in the art without departing from the scope and spirit of the invention. The foregoing embodiments may be implemented individually or in any combination.

What is claimed is:

1. A multichip package, comprising:
   a substrate;
   a high bandwidth memory (HBM) die mounted on the substrate; and
   a field-programmable gate array (FPGA) mounted on the substrate, wherein the FPGA is communicatively coupled to the HBM die via signal paths formed in the substrate, wherein the FPGA comprises:
   memory controller circuitry configured to control operation of the HBM die; and
   a switch configured to flexibly route communications between client-side application logic of the FPGA and a plurality of communication channels of the HBM die, wherein the plurality of communication channels of the HBM die is different from the signal paths formed in the substrate, wherein the switch is configurable to be bypassed to bind a channel interposed between the FPGA and the HBM die to one or more memory banks of the HBM die.

2. The multichip package of claim 1, wherein the FPGA comprises a plurality of channel interfaces, wherein the switch is positioned between the HBM die and a fabric of the FPGA.

3. The multichip package of claim 1, wherein the memory controller circuitry is communicatively coupled to the HBM die via the signal paths formed in the substrate.

4. The multichip package of claim 1, wherein the FPGA is configurable to support a plurality of communications protocols.

5. The multichip package of claim 1, wherein the FPGA is configured to support a plurality of channel interfaces that each support single data rate and double data rate communications.

6. The multichip package of claim 1, wherein the switch comprises a crossbar switch.

7. The multichip package of claim 1, wherein the substrate comprises an interposer.

8. The multichip package of claim 1, wherein the FPGA comprises input/output circuitry configured to enable communication between the FPGA and circuitry external to the substrate.

9. The multichip package of claim 1, wherein the HBM die is a first HBM die of a plurality of HBM dies mounted on the substrate.

10. A multichip package, comprising:
    a substrate;
    a high bandwidth memory (HBM) die mounted on the substrate; and
    a field-programmable gate array (FPGA) mounted on the substrate, wherein the FPGA is communicatively coupled to the HBM die via channels formed in the substrate, wherein the FPGA comprises:
    a memory controller configured to control operation of the HBM die; and
    switch circuitry configured to flexibly route communications between client-side application logic of the FPGA and a plurality of communication channels of the HBM die via the channels formed in the substrate, wherein:
    the plurality of communication channels of the HBM die is different from the channels formed in the substrate;

the switch circuitry is configured to enable an interface of the FPGA to communicate with a particular portion of the HBM die via a particular channel of the channels; and when the switch circuitry is bypassed, communication between the interface of the FPGA and the particular portion of the HBM die is bound to the particular channel of the channels.

11. The multichip package of claim 10, wherein FPGA comprises interface circuitry configured to:
support a plurality of memory interface protocols; and
simultaneously access:
a first memory bank in the HBM die using a first channel of the channels; and
a second memory bank in the HBM die using a second channel of the channels.

12. The multichip package of claim 10, wherein FPGA comprises interface circuitry configured to:
support a plurality of memory interface protocols; and
support a plurality of channel interfaces that each support single data rate and double data rate communications.

13. The multichip package of claim 10, wherein the interface supports a plurality of data widths.

14. The multichip package of claim 10, wherein:
the switch circuitry comprises a crossbar switch;
the substrate comprises an interposer;
the FPGA comprises input/output circuitry configured to enable communication between the FPGA and circuitry external to the substrate;
the memory controller is communicatively coupled to the HBM die via the channels formed in the substrate;
the FPGA is configurable to support a plurality of communications protocols; or
a combination thereof.

15. A multichip package comprising:
a substrate;
a plurality of high bandwidth memory (HBM) dies mounted on the substrate; and
a field programmable gate array (FPGA) mounted on the substrate, wherein the FPGA is communicatively coupled to the plurality of HBM dies via signal paths formed in the substrate, wherein the FPGA comprises:
memory controller circuitry configured to control operation of the plurality of HBM dies; and
switch circuitry configured to flexibly route communications between client-side application logic of the FPGA and a HBM die of the plurality of HBM dies, wherein the switch circuitry is configurable to be bypassed to bind a channel interposed between the FPGA and the HBM die to one or more memory banks of the HBM die.

16. The multichip package of claim 15, wherein the memory controller circuitry is communicatively coupled to the HBM die via the signal paths formed in the substrate.

17. The multichip package of claim 15, wherein the switch circuitry is configurable to enable the FPGA to simultaneously communicate with multiple channels of each HBM die of the plurality of HBM dies.

18. The multichip package of claim 15, wherein the switch circuitry is configurable to enable an interface of the FPGA to communicate with the HBM die via multiple channels of the HBM die.

19. The multichip package of claim 15, wherein:
the switch circuitry comprises a crossbar switch;
the substrate comprises an interposer;
the FPGA comprises input/output circuitry configured to enable communication between the FPGA and circuitry external to the substrate;
the FPGA is configurable to support a plurality of communications protocols; or
a combination thereof.

20. The multichip package of claim 15, wherein the FPGA comprises interface circuitry configured to support a plurality of memory interface protocols.

* * * * *